United States Patent
Yee et al.

(10) Patent No.: US 8,140,489 B2
(45) Date of Patent: Mar. 20, 2012

(54) SYSTEM AND METHOD FOR ANALYZING CONTENT ON A WEB PAGE USING AN EMBEDDED FILTER

(75) Inventors: David R. Yee, Burlingame, CA (US); Peter Wallack, Sunnyvale, CA (US); Hok-Min Lie, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 533 days.

(21) Appl. No.: 10/808,885

(22) Filed: Mar. 24, 2004

(65) Prior Publication Data
US 2005/0216471 A1    Sep. 29, 2005

(51) Int. Cl.
G06F 17/30    (2006.01)
G06F 7/00    (2006.01)

(52) U.S. Cl. ........ 707/690; 709/224; 715/234; 715/762; 717/109; 717/125

(58) Field of Classification Search ........................ None
See application file for complete search history.

(56) References Cited

U.S. PATENT DOCUMENTS

| | | | |
|---|---|---|---|
| 6,510,458 B1* | 1/2003 | Berstis et al. | 709/219 |
| 7,451,391 B1* | 11/2008 | Coleman et al. | 715/234 |
| 2002/0103914 A1* | 8/2002 | Dutta et al. | 709/229 |
| 2002/0156799 A1* | 10/2002 | Markel et al. | 707/202 |
| 2003/0061283 A1* | 3/2003 | Dutta et al. | 709/204 |
| 2004/0148568 A1* | 7/2004 | Springer | 715/513 |
| 2008/0172717 A1* | 7/2008 | Malcolm | 726/1 |

OTHER PUBLICATIONS

Brewer, Judy et al., "Evaluating Web Sites for Accessibility" Nov. 7, 2002, W3C, pp. 1-8.*

* cited by examiner

*Primary Examiner* — Alicia Lewis
(74) *Attorney, Agent, or Firm* — Kilpatrick Townsend & Stockton LLP

(57) ABSTRACT

A method for analyzing content on a web page. In one method embodiment, the present invention accesses a web page having content. Additionally, the web page is processed through a filter wherein the filter transfers the content of the web page to an analyzer. The analyzer analyzes the content of the web page. The analyzer then returns the result of the analyzing to the server which appends the result of the analyzing to the content of the web page. The results are then displayed on the web page. In so doing, the ability to provide an analysis of the functionality of a web page at the time of development is provided.

23 Claims, 5 Drawing Sheets

400

310

This is a test [x] my image and a second error [x] asdgkjhas dga dg a dg ads g as dgasdgasdg asd gladsgjh ajsdhglkajg lkajhdg lkjahg lasd g adsglajdg lkajdsgh lkajhdg lkajhdg lkjah dsglkjad sglkhjasd lkghjas dg asdglk jashdglj asdlgjh aldskgh alsd hlaksjg lkasjg sda glasdjghlajsd glkadshglkh This is a link to the second page.

Accessibility analysis    410

Elements analyzed: 9

| Priority 415 | Section 420 | Description 425 | Line/Char position 430 |
|---|---|---|---|
| 3 | OGHAG Nav_4_A | A method for skipping repetitive navigation links is required. | Within Page |
| P1 | 1194.22(a)_3 | An ALT attribute is required for IMG tag. | L9 C61 (near "id244") |
| P1? | 1194.22(c)_1 | Color must not be used as the only means of conveying information. | Within Page |
| P1? | 1194.22(d)_1 | Documents are required to be useable without an associated style sheet. | Within Page |
| P1? | 1194.22(k)_1 | If web pages are not able to comply with 1194.22, then they are required to comply by providing a text-only pages, which are to be kept in synch with the main pages. | Within Page |
| P1? | 1194.22(o)_1 | A method for allowing users to skip repetitive links on a page, thereby allowing them direct access to main content, is required. | Within Page |
| P3 | WCAG4.3_1 | HTML tags require LANG attributes. Primary language not specified for document. | L2 C0 |

FIG 4

SYSTEM AND METHOD FOR ANALYZING CONTENT ON A WEB PAGE USING AN EMBEDDED FILTER

FIELD OF THE INVENTION

The present invention relates to the field of web page content. Specifically, the present invention relates to analyzing content on a web page using an embedded filter.

BACKGROUND ART

In 1998, Congress amended the Rehabilitation Act to require Federal agencies to make their electronic and information technology accessible to people with disabilities stating, "inaccessible technology interferes with an individual's ability to obtain and use information quickly and easily." Therefore, Section 508 was enacted to eliminate barriers in information technology, to make available new opportunities for people with disabilities, and to encourage development of technologies that will help achieve these goals. The law applies to all Federal agencies when they develop, procure, maintain, or use electronic and information technology. Under Section 508 (29 U.S.C. '794d), agencies must give disabled employees and members of the public access to information that is comparable to the access available to others. Moreover, it is important for companies to also adhere to the Section 508 standards to ensure their electronic and information technology may be maintained, procured, and used by any federal agencies or other groups bound to the same standards.

In order to ensure that electronic content conforms to the rules of Section 508, the product (e.g., web site, web page, electronic form, etc.) should be checked for accessibility. For example, the checking includes ensuring that if a page includes an image there is text in the hyper text mark-up language (HTML) that can take the place of the picture for a browser that does not display pictures (e.g., a browser for the blind). In another example, there may be tags within a table (e.g., column and row tags) which allow a user to follow the table without needing to see it. In yet another example, a check may be necessary to ensure that a form field (e.g., user name and password) is correctly coded. That is, when a field is highlighted there is text or other type of prompt (e.g., voice) that describes the information requested by the field in question. This may include many types of visual and/or audio HTML tags.

The current method for analyzing an electronic product (e.g., a static web page) for conformation with Section 508 at the developmental level requires an analyzer to search out the web site in question (e.g., on a network), analyze the web page and store the results on a database. A report may then be requested by the testing party wherein the results stored on the database are formatted (e.g., as an itemized list) and returned to the testing party.

However, the current method is cumbersome, and as technology progresses the ability for an analyzer to reach into a network for a specific web page is becoming more difficult. For example, in order to more efficiently maintain a network, instead of every machine having its own Internet protocol (IP) address, a block of computers on a network may dynamically allocate the IP addresses using DHCP. That is, the machines connected with the network may have IP addresses that change over time. For example, when a computer is on the network it may have one IP address, but then when it leaves the network it may give up the IP address, and the address may be assigned to another computer on the network. Thus, there is no need for a network to maintain a fixed, large list of IP addresses for each of the computers capable of accessing the network. Instead, there may be a pool of IP addresses which can cover the same number of computers with a much smaller framework.

As the use of DHCP grows, actually finding a machine on a network becomes more difficult. Instead of simply inputting a network address, accessing a domain name server, and mapping directly to the machine having the network content, due to dynamic allocation of IP addresses, a user must now input the machine identifier as well. This is a cumbersome and difficult proposal. In general, machine identifiers are large and inconvenient to remember, input, pass on, and the like.

Therefore, when testing a web page on the network, assurances are made that instead of using a domain name, the machine name is input. In addition, the use of the machine name may not allow the developer access to the computer due to possible incorrect mapping, thereby preventing the analyzer from finding the machine and ultimately the web page to be analyzed. Furthermore, as the number of machines accessing the dynamic network increase, the mapping and finding problems associated with finding a single machine become even more deleterious.

Due to the above stated issues, testing electronic and information technology to ensure proper operation under Section 508 has become difficult and time consuming. Moreover, when a change is made to Section 508, each previously tested page is found and tested again thereby encompassing additional time-consuming mapping, machine naming, and searching to find the correct electronic information. Furthermore, the pages are tested statically and cannot be tested dynamically. For example, once the information is analyzed, a second report is accessed and the web page updated accordingly. If any errors were present, the page must then be tested again after all the changes have been made and a third report accessed.

SUMMARY OF INVENTION

The present invention provides, in various embodiments, describe a method and system for analyzing content on a web page using a filter-based system. Furthermore, the present invention provides a method and system for analyzing content on a web page which may be performed at near real time in the development process. Additionally, the present invention provides a method and system for analyzing content on a web page which may be used for accessibility checking.

Specifically, in one embodiment, the present invention responds to a generated web page having content. Additionally, the web page is processed through a filter wherein the filter transfers the content of the web page to an external analyzer. The analyzer analyzes the content of the web page. The analyzer then returns the result of the analyzing to the server which appends the result of the analyzing to the content of the web page. In so doing, the ability to provide an analysis of the functionality of a web page at the time of development is provided. In one example, the analyzer checks for accessibility of the web page, but any rule based checking could be implemented.

For example, in one embodiment, the present invention launches an embedded server in a development environment. This server is configured to run a servlet filter, which intercepts the request made to the server and the response provided by the server. The filter intercepts the data (e.g., HTML, or the like) generated by the embedded server, sends the data to a hosted service of a checker (e.g., accessibility) for processing, and then produces the checker results on the same page as what was analyzed. This generates analysis results immediately for the user. In one embodiment, the system provides a mapping from what a user is working on (e.g., JDeveloper rapid application development item identifiers) and what the servlet filter reports (same identifiers) so that the caller can find and fix problems in the same environment in which they are working (or in a familiar context).

In addition, the added functionality at development time provides an immediate solution to developers to help them develop code more efficiently. These features may apply to any HTML testing of any page, as well as other formats including regression testing capture/playback and image accessibility analysis.

In one embodiment, the system may be used in the development of accessibility coding for standards adherence.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 4 is a diagram of an exemplary web page layout with appended content analysis results in accordance with an embodiment of the present invention.

DETAILED DESCRIPTION OF THE INVENTION

Figure 1:
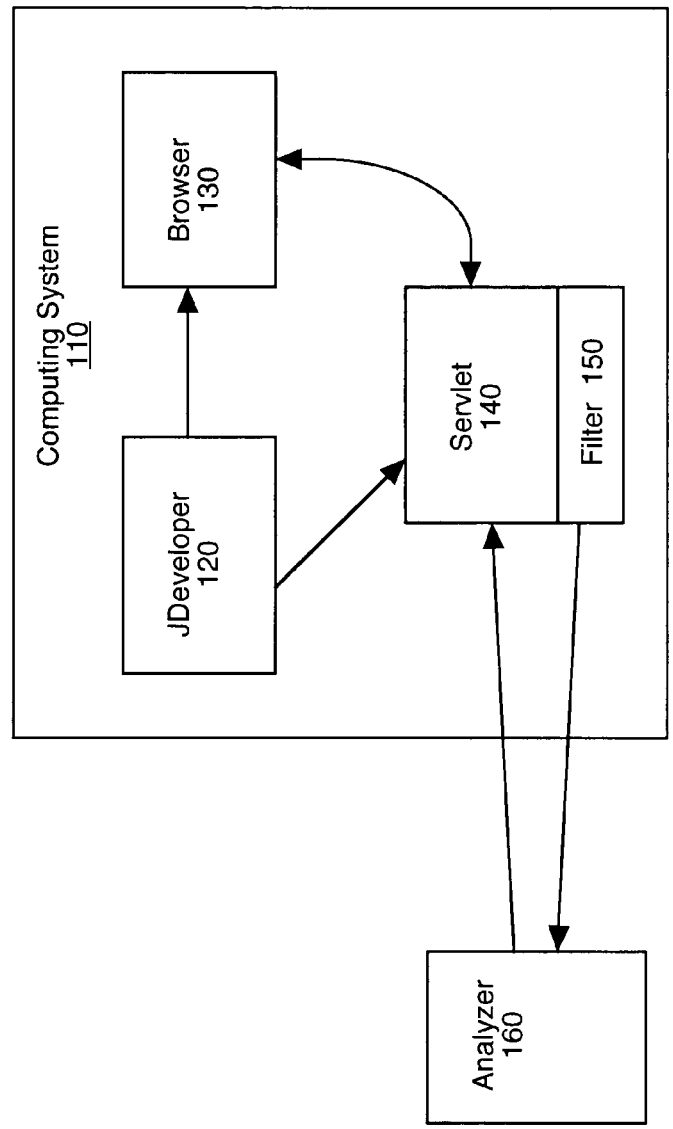
FIG. 1 is a block diagram of an embodiment of an exemplary content analyzing system in accordance with an embodiment of the present invention.

Reference will now be made in detail to embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an electronic computing device and/or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "partitioning", "receiving", "processing", "creating", "storing", "delivering", "accessing", "generating", "providing", "separating", "outputting", "performing", "marking" or the like, refer to the action and processes of a computer system, or similar electronic computing device, that manipulates and transforms data. The data is represented as physical (electronic) quantities within the computing device's registers and memories and is transformed into other data similarly represented as physical quantities within the computing device's memories or registers or other such information storage, transmission, or display devices.

With reference now to FIG. 1, a block diagram of an exemplary content analyzing system is shown in accordance with an embodiment of the present invention. In one embodiment, the content analyzing system 100 is used to analyze a web page at the developer level. That is, a user can analyze a developing (or developed) web page at real time or near real time. The analysis may be a measure of the web pages conformity to an established standard (e.g., Section 508 (29 U.S.C. '794d) of the Rehabilitation Act), or to a personal standard, or against any rule-based code. Moreover, the data is pushed to the analyzer not vice-versa, therefore, the difficulties with dynamic IP addresses are moot.

System 100 includes a computing system 110. Computing system 110 may be any type of computing system (e.g., a desktop, laptop, handheld, or the like) such as described in FIG. 5. In one embodiment, computing system 110 includes a developer 120, a browser 130, and a servlet 140. In addition, servlet 140 includes a filter 150. Developer 120 may be any type of web page development tool such as JDeveloper (a Java coding tool), or the like which may be used on a computing system to construct, modify, evaluate, enhance, reduce, or otherwise manipulate content on a web page. For purposes herein, a web page may be any type of electronic content to include forms, graphics, links, information, tables, and the like which may incorporate a plurality of computer code (e.g., HTML, Java, JPEG, MPEG, Applets, and the like).

With reference still to FIG. 1, in one embodiment, browser 130 is any program which may be used to access content from a web page. In one embodiment, servlet 140 is a web server which is utilized to run the page the coder or developer 120 has written (or is writing). In one embodiment, servlet 140 is a small web server which also operates on the same computing system 110 as the developer 120 and the browser 130. Additionally, servlet 140 is configured to run a filter (or servlet filter) 150 which in one embodiment is a piece of code that operates in a J2EE environment.

Also in system 100 is an analyzer 160. In one embodiment, analyzer 160 operates on a separate computing system. In general, analyzer 160 is a tool used to test an application's HTML (.jar, .zip, Java, JPEG's, MPEG's, or other content on a web page). In one embodiment, the analyzer 160 takes an HTML file or stream as input, processes it according to its established coding standards rules, and generates a java.lang.String result to report to users. For example, analyzer 160 may be used to test the HTML of the web page on servlet 140 for proper accessibility coding standards adherence.

In general, embodiments of the present invention provide a servlet filter 150 to operate in conjunction with the analyzer 160 of FIG. 1. For example, when testing a web site, the developer 120 requests rendering of an HTML page by the embedded servlet 140. The server is configured to run a servlet filter 150 which intercepts the request made to the servlet 140 and the response provided by the servlet 140. The filter 150 accesses the content (e.g., HTML page or the like) generated by the embedded servlet 140, sends the HTML (or the like) to a hosted service (analyzer 160) for processing, and then produces the results of the analysis on the same page as the original content generated by the embedded servlet 140. Thus, the analysis results are generated immediately for the user.

In another embodiment, the developer 120 may also allow this function (filter 150) to be turned on or off as desired. Furthermore, system 100 provides a mapping from what a user is working on (developer 120 rapid application development item IDs) and what the servlet filter 150 reports (same IDs) so that the user can find and fix problems while remaining in the environment in which they are working.

Figure 2:
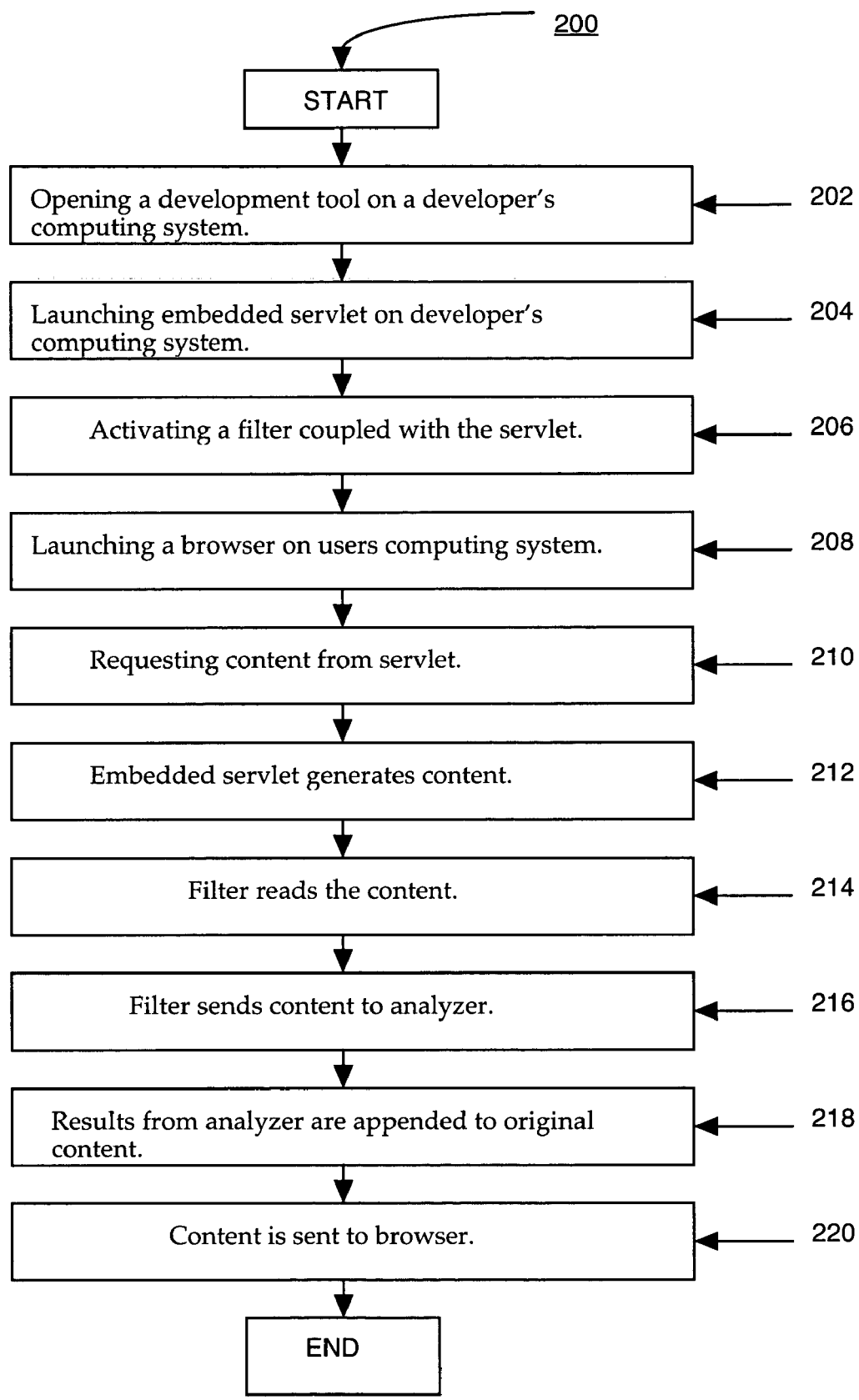
FIG. 2 is a flowchart of computer-implemented steps performed in accordance with one embodiment of the present invention for analyzing character data.

With reference now to FIG. 2, a flowchart of steps performed in accordance with one embodiment of the present invention for analyzing character data is shown. In one embodiment, the steps of flowchart 200 are performed by a user on the developer's computing system 110 under computer control.

Referring now to step 202 of FIG. 2 and to FIG. 1, in one embodiment, a development tool is opened on a developer's computing system. Although a developer's computing system (e.g., computing system 110) is stated, the developer may be a manager, evaluator, tester, user, colleague, or the like, who has reason to have intimate access with the content to be analyzed. However, for purposes of clarity the term developer and/or user will be used for clarity herein.

Referring now to step 204 of FIG. 2 and to FIG. 1, in one embodiment an embedded servlet is launched on the computing system 110. The embedded servlet is used to run the content the developer (or coder) has written or is testing. Although in one embodiment, the content being tested may be new, in another embodiment, it may be content being updated or checked due to rule changes (or after a specific time frame, or for evaluation purposes, or the like).

Referring now to step 206 of FIG. 2 and to FIG. 1, in one embodiment a filter 150 coupled with the servlet 140 is activated. In general, any page that is requested of the servlet 140 may go through any sequence of filters 150. If more than one filter 150 is present, the filters 150 are called in chain fashion (e.g., one to the next).

Referring now to step 208 of FIG. 2 and to FIG. 1, in one embodiment a browser 130 is launched on the developer's computing system 110. For example, the browser 130 is launched on a local (e.g., internal) network and therefore needs no IP address. In one embodiment, the browser 130 may be a network browser, Internet browser, personal browser, company browser, HTML display program, or the like, which is used to display web page content.

Referring now to step 210 of FIG. 2 and to FIG. 1, in one embodiment the desired content (e.g., web page) from the servlet 140 is requested. The request is received from the browser 130. In one embodiment, the browser 130 and servlet 140 are operating on the same computing system 110.

Referring now to step 212 of FIG. 2 and to FIG. 1, in one embodiment the content is generated on the embedded servlet 140. The content may be in the form of a web page. In one embodiment, if the filter 150 is turned off by the developer the content is delivered to the browser 130 from the servlet 140 and the process is complete. This is in the same fashion as normal content reception on a network or web environment is transmitted, which is well known in the art. However, if the filter 150 is turned on, that is the content is to be analyzed, then the filter 150 requests the content to be generated by servlet 140, and intercepts the output for later processing.

Referring now to step 214 of FIG. 2 and to FIG. 1, in one embodiment the filter 150 reads the content and saves the content to a file in HTML format. For example, the client browser 130 calls the servlet 140 and requests a page. The system 100 then configures a web.xml file such that the HTTP request does not go to the servlet 140. Instead, it goes to any filter that is specified in web.xml. One such filter is the servlet filter 150.

Thus, the servlet filter 150 receives the HTTP request for the given page. It passes that request along the chain of filters to the next in line, which typically is the servlet 140 itself. The servlet 140 generates HTML as it normally would, for example, going through transformation steps from metadata through an HTML rendering engine and out to HTML. However, where the servlet 140 would normally write to an output stream which communicates to the browser 130, instead the servlet filter 150 has placed an interceding output stream, which captures the HTML in a file. Thus, when the servlet 140 is finished generating HTML, it actually has written to the temporary file created by the servlet filter 150.

In one embodiment, there are two parameters particular to the filter 150 that are passed as initial parameters via the web.xml. They are accessibility checker (AC) server and AC port. The AC server parameter values refer to a hostname of the machine where the analyzer 160 is running. The AC port parameter specifies the port number on which the analyzer 160 is listening. One exemplary embodiment of the code is shown herein. The OACFilter pattern is shown here as a wildcard, but could be made specific to OA.jsp or to a pattern, such as "*.jsp".

```
! Service-based example of XML
<filter>
    <filter-name>OACFilter</filter-name>
    <filter-class>oracle.ada.filter.OACFilter</filter-class>
    <init-param>
        <param-name>OACServer</param-name>
        <param-value>oacserver.us.oracle.com</param-value>
    </init-param>
    <init-param>
        <param-name>OACPort</param-name>
        <param-value>7891</param-value>
    </init-param>
</filter>
<filter-mapping>
    <filter-name>OACFilter</filter-name>
    <url-pattern>/OA.jsp</url-pattern>
</filter-mapping>
```

In one embodiment, the filter 150 utilizes a Java application to act as a listener and server for processing the HTML pages and returning analysis results. For example, it may include an outside listener that listens to a specified socket. Upon receiving a request on the socket, it immediately forks a thread off to process the page. The thread reads the HTML from the socket and stores the data in a file. When reading completes, it calls the analyzer 160 to analyze the page (e.g., HTML data). Once the java.land.String of results are received from the analyzer 160, they are sent back to the caller on the socket's output stream. Therefore, in one embodiment, the filter 150 does not use a database at all. It reads messages from a message file and maintains errors only temporarily in memory for reporting to a user.

Referring now to step 216 of FIG. 2 and to FIG. 1, in one embodiment the filter 150 sends the saved content to the analyzer 160. The analyzer 160 then checks the content for errors. For example, if the analyzer 160 is checking for accessibility (e.g., section 508 of the rehabilitation act), the content will be checked to ensure correct HTML tags exist for browsers which do not display images, or that text fields are descriptively labeled, or the like. In another embodiment, the analyzer 160 may check to ensure the content is coded to HTML standards, or the number of words on a page, or how many images, or proper structure, or if every page has required footnotes or headers (e.g., privacy notices).

In yet another embodiment, the filter 150 and analyzer 160 may perform regression testing. That is, as a user clicks through links, the clicks are captured and a baseline is found. Then the clicks are replayed and analyzed at a later date to see if the results are better, worse, different, or the like. In a further embodiment, filter 150 may pass JPEG or MPEG files to the analyzer 160 for image analysis (e.g., sufficient contrast, red-green analysis, and the like).

In addition, due to the location of the filter 150, secure web page content may also be analyzed without requiring additional steps. For example, in the prior art, an analyzer accessed the server for the page and therefore if the page was encrypted the server sent the page content encrypted and it was the responsibility of the analyzer to decrypt and analyze the content. However, the filter 150 used in the present embodiment may receive and transmit the page content to the analyzer 160 prior to the encryption process. Therefore, not only is no decryption required by the analyzer 160, the resulting information from the analyzer 160 is appended to the page prior to the encryption of the page. Thus, the results appended to the page are also encrypted when received to the browser 130.

In one embodiment, the filter 150 includes lines of content, possibly in web.xml which directs the filter 150 to the location of the analyzer 160. Therefore, there is no need for the analyzer to search for the location of the machine having the content to be tested since the machine having the content to be tested is accessing the analyzer 160. In addition, if the analyzer 160 changes location, the filter 150 can be updated to the new location of the analyzer 160.

The filter 150 may also include extensible protocols for other possible future updates. For example, the filter 150 may be extended to inform the analyzer 160 to only fun the section 508 rules not international rules or to output the results in text instead of HTML or other language. In addition, the HTML from the filter 150 to the analyzer 160 may include a tag from the filter 150 telling the analyzer 160 what to analyze or how to analyze, or specific items on a per user or per page basis. The web.xml of the filter 150 may also be able to discern if the analyzer 160 is non-operational and post results on the browser 130 accordingly, thereby preventing a non-operational analyzer 160 from crashing the computing system 110.

Referring now to step 218 of FIG. 2 and to FIG. 1, in one embodiment, the results from the analyzer 160 are returned to the servlet 140 and appended to the original content. For example, analyzer 160 returns the string of analysis results to the servlet filter 150. The filter appends the results to the web page that the servlet 140 itself produced, and sends the resulting HTML to the browser 130 at the client tier. In one embodiment, the library for this is named oacfilter.jar.

In one embodiment, the servlet filter 150 component is installed alongside developer 120 and the computing system 110 environment is configured to include the oacfilter.jar library. To configure the servlet 140, the web.xml file in use by computing system 110 (under the OA_HTML directory) is set up to run the filter 150 and pass appropriate parameters to it. When computing system 110 is set up by users not to perform accessibility checking, the web.xml file may have no mention of filter 150 configurations. This will withhold the filter 150 from the embedded servlet 140 runtime environment when the user is doing other work. In one embodiment, in order to perform the analysis or testing, the web site is run within its own internal server.

In one embodiment, if the content is a web page, then the results of the analyzer 160 will be appended to the page. The appending may occur at the bottom as shown in FIG. 4, the appending may occur to the side of the page or to the top, or may be adjustable based on the preference of the user.

Referring now to step 220 of FIG. 2 and to FIG. 1, in one embodiment the content is returned to the browser 130. Therefore, in one embodiment, when content is requested to be analyzed the user is shown the web page on the browser 130 in a true to life rendition. In addition, the page will also show any detected mistakes or errors in code on the page. Therefore, if further content needs to be checked (e.g., a plurality of linked web pages), a user may simply click on the link to the next page and, as long as the filter 150 is active, the next page will be displayed and any errors recognized by the analyzer 160 regarding the new page will be appended to the new page. In addition to maintaining the error results on the page having the errors, in one embodiment, the user need also only maintain one copy of the rules being evaluated. For example, if the rules are updated, it is simply a matter of updating the analyzer 160. Then, each page can be re-checked against the now new rules thereby saving deployment of software on a developer's computing system.

Figure 3:
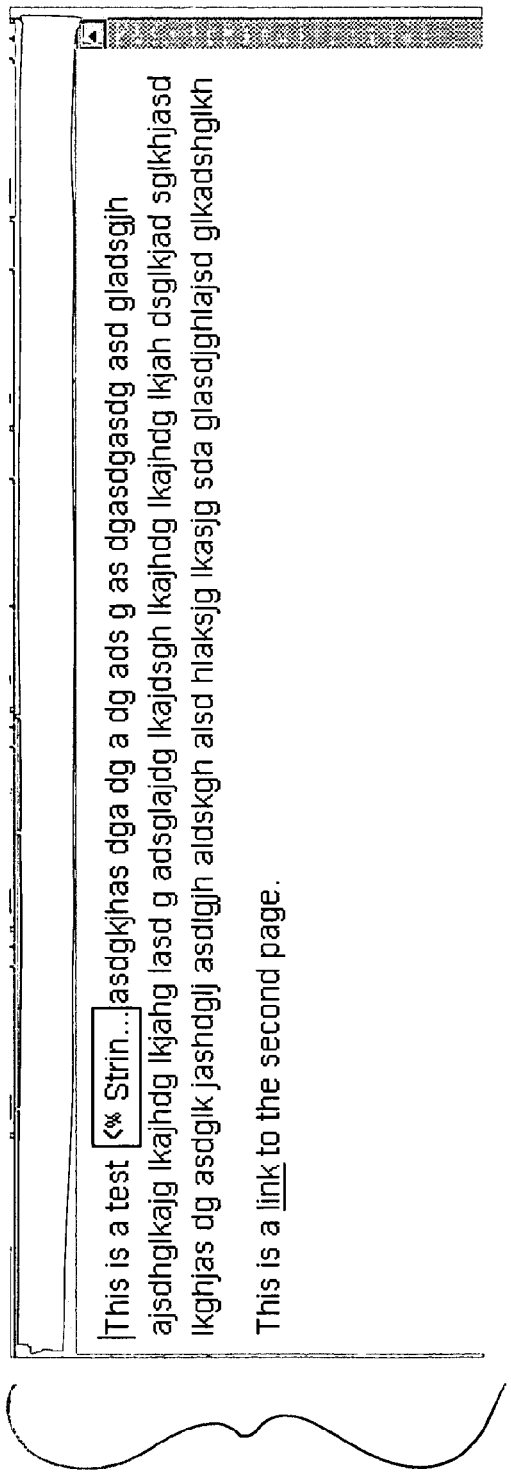
FIG. 3 is a diagram of an exemplary web page layout in accordance with an embodiment of the present invention.

With reference now to FIG. 3, a diagram of an exemplary web page layout is shown in accordance with an embodiment of the present invention. That is, web page 300 illustrates one embodiment for presenting the content 310 described herein. For example, the content 310 of web page 300 is shown as if the filter 150 of FIG. 1 were turned off by the developer. Moreover, the content 310 of web page 300 is shown in the same format as it will be displayed once the content 310 is released to the network.

With reference now to FIG. 4, a diagram of an exemplary web page layout with appended content analysis results is shown in accordance with an embodiment of the present invention. For example, the content 310 of web page 400 is shown as if the filter 150 of FIG. 1 were operating and the analyzer 160 had found errors and returned them as results 410 amended to the content 310. Moreover, the content 310 of web page 400 is shown as it will be once the content 310 is released to the network. Therefore, a user is able to compare the results 410 with the content 310 while also being able to view and interact with the content 310 displayed on web page 400 (e.g., link access, and the like).

Thus, in one embodiment, the amended results 410 include columns for priority 415, section 420, description 425, and line/character position 430. Priority 415 portrays the importance of the error found, section 420 quotes the rule or section of rules which guide the logic behind the error, description 425 describes the error, and line/char position 430 lists the location of the error in the code for the page. Although the four columns are shown in the amended results 410, there may be more or fewer columns having more, fewer, and/or different information displayed. Additionally, the format of the amended results 410 may be organized in a plurality of different formats or priorities as desired by a user.

In one embodiment, to test for accessibility, a user can set one or more flags on the computing system 110 and turn on the applications own accessibility mode, which causes a filter to generate accessible HTML. With the filter 150 turned on, the analysis results of a generated page's HTML will be presented at the bottom of the user's page. In some cases, this may require the user to scroll down or over to see the information. The information (e.g., results from analyzer) is sufficient to allow a user to find out the root cause of any errors or problems. In one embodiment, the analyzer 160 will also include HTML ID attributes that are associated with HTML elements that exhibit problems, and those ID attribute values will map to metadata in the extension framework. The report from the analyzer 160 may further indicate where in the generated HTML the problem is occurring, and provide the metadata identifier. In another embodiment, a link from each reported violation will allow a user to refer to coding examples of how to fix problems in HTML and metadata. Then, the user may fix the code in the metadata, and rerun the application to see the effects. As stated herein, the user may also click between pages within the scope of the developer 120 in the course of testing.

In one embodiment, if the analyzer becomes outdated or is inaccessible with respect to the filter 150, an error message will be generated informing the user that an improper HTML response was received from the analyzer 160. This may occur if the filter 150 is updated to expect a certain response for the analyzer 160, yet the analyzer 160 has not yet been upgraded.

Figure 5:
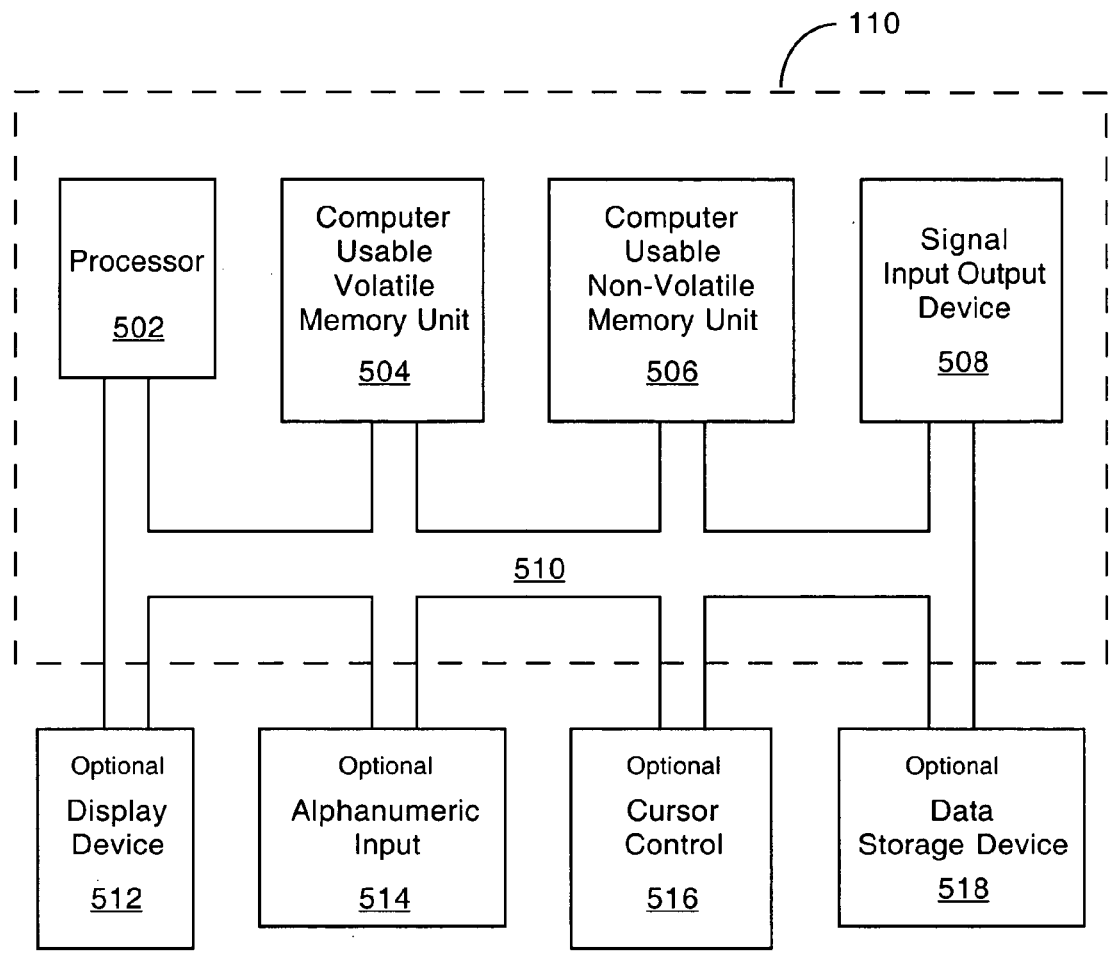
FIG. 5 is a block diagram of an embodiment of an exemplary computer system used in accordance with the present invention.

With reference now to FIG. 5, a block diagram of an embodiment of an exemplary computer system 110 used in accordance with the present invention. It should be appreciated that system 110 is not strictly limited to be a computer system. As such, system 110 of the present embodiment is well suited to be any type of computing device (e.g., server computer, portable computing device, desktop computer, mobile phone, pager, personal digital assistant, etc.). Within the following discussions of the present invention, certain processes and steps are discussed that are realized, in one embodiment, as a series of instructions (e.g., software program) that reside within computer readable memory units of computer system 110 and executed by a processor(s) of system 110. When executed, the instructions cause computer 110 to perform specific actions and exhibit specific behavior that is described in detail herein.

Computer system 110 of FIG. 5 comprises an address/data bus 510 for communicating information, one or more central processors 502 coupled with bus 510 for processing information and instructions. Central processor unit(s) 502 may be a microprocessor or any other type of processor. The computer 110 also includes data storage features such as a computer usable volatile memory unit 504 (e.g., random access memory, static RAM, dynamic RAM, etc.) coupled with bus 510 for storing information and instructions for central processor(s) 502, a computer usable non-volatile memory unit 506 (e.g., read only memory, programmable ROM, flash memory, EPROM, EEPROM, etc.) coupled with bus 510 for storing static information and instructions for processor(s) 502. System 110 also includes one or more signal generating and receiving devices 508 coupled with bus 510 for enabling system 110 to interface with other electronic devices and computer systems. The communication interface(s) 508 of the present embodiment may include wired and/or wireless communication technology. For example, within the present embodiment, the communication interface 508 may be a serial communication port, a Universal Serial Bus (USB), an Ethernet adapter, a FireWire (IEEE 1394) interface, a parallel port, a small computer system interface (SCSI) bus interface, infrared (IR) communication port, Bluetooth wireless communication port, a broadband interface, or an interface to the Internet, among others.

Optionally, computer system 110 may include an alphanumeric input device 514 including alphanumeric and function keys coupled to the bus 510 for communicating information and command selections to the central processor(s) 502. The computer 110 can include an optional cursor control or cursor directing device 516 coupled to the bus 510 for communicating user input information and command selections to the central processor(s) 502. The cursor-directing device 516 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 514 using special keys and key sequence commands. The present embodiment is also well suited to directing a cursor by other means such as, for example, voice commands.

The system 110 of FIG. 5 may also include one or more optional computer usable data storage devices 518 such as a magnetic or optical disk and disk drive (e.g., hard drive or floppy diskette) coupled with bus 510 for storing information and instructions. An optional display device 512 is coupled to bus 510 of system 110 for displaying video and/or graphics. It should be appreciated that optional display device 512 may be a cathode ray tube (CRT), flat panel liquid crystal display (LCD), field emission display (FED), plasma display or any other display device suitable for displaying video and/or graphic images and alphanumeric characters recognizable to a user.

Thus, the present invention provides, in various embodiments, a method and system for analyzing character data. Furthermore, the present invention provides a method and system for analyzing character data and partitions the character data string into either single-byte character data string or multi-byte data. Additionally, the present invention provides a method and system for analyzing character data faster and less expensively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A method of analyzing content of a web page with a computing system, said method comprising:
    executing with a processor one or more software components, wherein the software components include a developer tool for manipulating content of the web page by a developer, a servlet, an analyzer, and a filter;
    accessing said web page comprising said content by the servlet in response to a request from the development tool, wherein said content comprises secure content including a plurality of content items and wherein the request from the development tool comprises a request to modify the content of the web page by the developer;

intercepting the request from the development tool by the filter and processing the web page by the filter prior to encryption of said secure content by the servlet;

transferring the content of the web page from the filter to the analyzer;

analyzing the content of the web page by the analyzer prior to encryption of said secure content, wherein analyzing the content comprises measuring conformity of each of the plurality of content items of the web page with a set of pre-defined rules maintained by the analyzer and defining an established standard for the web page;

mapping by the analyzer a result of said analyzing to each of the plurality of content items of the web page;

returning the result of said analyzing and said mapping from the analyzer to the servlet;

appending the result of said analyzing to the content of said web page by the servlet based on said mapping, wherein the result comprises an indication of importance of an error found when analyzing the content of the web page, an indication of a section of the pre-defined rules to which the error relates, a description of the error, and an indication of a location of the error in the web page; and providing for display the content of the web page and the result of said analyzing together on the same web page from the development tool to a browser for manipulation of the content of the web page by the developer.

2. The method as recited in claim 1 wherein said accessing said web page comprising content is performed by an application server operating on a first computing system.

3. The method as recited in claim 2 wherein said filter is a function of the application server, and wherein said filter is selectively activated by a web page development tool accessible to said first computing system.

4. The method as recited in claim 2 wherein said server and said filter operate on said first computing system.

5. The method as recited in claim 2 wherein said analyzer operates on a second computing system that is communicatively coupled with said first computing system.

6. The method as recited in claim 1 wherein said filter transfers content of the web page to the analyzer in a hypertext mark-up language (HTML) format.

7. The method of claim 1, wherein said processing a web page further comprises performing sequential filtering of said web page using a plurality of filters of said filter.

8. The method of claim 1, wherein accessing said web page, intercepting the request from the development tool, transferring the content of the web page, and analyzing the content of the web page are performed during testing or development of the web page by the developer.

9. The method of claim 8, wherein returning a result of said analyzing, appending the result of said analyzing to the content of said web page, and displaying said web page and said result are performed during the testing or development of the web page by the developer.

10. A computer system comprising:
a bus;
a memory unit coupled with said bus; and
a processor coupled with said bus, said processor configured to execute a method of analyzing content of a web page comprising:
receiving a request for said web page from a development tool for manipulating content of the web page during testing or development of the web page;
generating said web page on a server in response to the request, wherein said content comprises secure content including a plurality of content items;
processing the web page using a filter prior to encryption of said secure content;
transferring the content of the web page from the filter to an analyzer;
analyzing the content of the web page prior to encryption of said secure content, wherein analyzing the content comprises measuring conformity of each of the plurality of content items of the web page with a pre-defined set of rules maintained by the analyzer and defining an established standard;
mapping a result of said analyzing to each of the plurality of content items of the web page;
returning the result of said analyzing and said mapping to said server;
appending the result of said analyzing to the content of said web page based on said mapping, wherein the result comprises an indication of importance of an error found when analyzing the content of the web page, an indication of a section of the pre-defined rules to which the error relates, a description of the error, and an indication of a location of the error in the web page; and
providing for display the content of the web page and the result of said analyzing together on the same web page to a browser for the developer to perform said testing or development of the web page.

11. The computer system of claim 10 wherein said server is an application server operating on a first computing system.

12. The computer system of claim 11 wherein said filter is a function of the application server.

13. The computer system of claim 11 wherein said server and said filter operate on said first computing system.

14. The computer system of claim 13 wherein said request for said web page is generated by a browser operating on said first computing system.

15. The computer system of claim 11 wherein said analyzer operates on a second computing system that is communicatively coupled with said first computing system.

16. The computer system of claim 10 wherein the filter transfers content of the web page to the analyzer in a hypertext mark-up language (HTML) format.

17. A computer-usable medium having computer-readable program code embodied therein for causing a computer system to perform a method of analyzing content of a web page, said method comprising:
accessing said web page comprising said content in response to a request from a development tool for manipulating content of the web page by a developer, wherein said content comprises secure content including a plurality of content items and wherein accessing said web page is performed during testing or development of the web page;
processing the web page using a filter prior to encryption of said secure content;
transferring the content of the web page from the filter to an analyzer;
analyzing the content of the web page at said analyzer prior to encryption of said secure content, wherein analyzing the content comprises measuring conformity of each of the plurality of content items of the web page with a pre-defined set of rules maintained by the analyzer and defining an established standard;
mapping a result of said analyzing to each of the plurality of content items of the web page;

returning the result of said analyzing and said mapping to a server;

appending the result of said analyzing to the content of said web page based on said mapping, wherein the result comprises an indication of importance of an error found when analyzing the content of the web page, an indication of a section of the pre-defined rules to which the error relates, a description of the error, and an indication of a location of the error in the web page; and providing for display the content of the web page and the result of said analyzing together on the same web page to a browser for manipulation of the content of the web page by the developer.

18. The computer-usable medium of claim 17 wherein said generating of a web page comprising content is performed by an application server operating on a first computing system.

19. The computer-usable medium of claim 18 wherein said server and said filter operate on said first computing system.

20. The computer-usable medium of claim 18 wherein a request for said web page is generated by a browser operating on said first computing system.

21. The computer-usable medium of claim 18 wherein said analyzer operates on a second computing system that is communicatively coupled with said first computing system.

22. The computer-usable medium of claim 17 wherein said filter is a function of the application server.

23. The computer-usable medium of claim 17 wherein the filter transfers content of the web page to the analyzer in a hypertext mark-up language (HTML) format.

* * * * *